United States Patent
Berard et al.

(10) Patent No.: US 9,760,726 B2
(45) Date of Patent: Sep. 12, 2017

(54) METHOD FOR REMOTELY DELIVERING A FULL SUBSCRIPTION PROFILE TO A UICC OVER IP

(75) Inventors: Xavier Berard, Cadolive (FR); Denis Gachon, Saint-Zacharie (FR)

(73) Assignee: GEMALTO SA, Meudon (FR)

( * ) Notice: Subject to any disclaimer, the term of this patent is extended or adjusted under 35 U.S.C. 154(b) by 0 days.

(21) Appl. No.: 13/991,846

(22) PCT Filed: Dec. 2, 2011

(86) PCT No.: PCT/EP2011/071675
§ 371 (c)(1),
(2), (4) Date: Aug. 23, 2013

(87) PCT Pub. No.: WO2012/076425
PCT Pub. Date: Jun. 14, 2012

(65) Prior Publication Data
US 2013/0329683 A1    Dec. 12, 2013

Related U.S. Application Data

(63) Continuation of application No. 13/312,309, filed on Dec. 6, 2011, now Pat. No. 9,301,145.

(30) Foreign Application Priority Data

Dec. 6, 2010  (EP) .................................. 10306359

(51) Int. Cl.
*G06F 21/62*   (2013.01)
*H04W 8/24*    (2009.01)
(Continued)

(52) U.S. Cl.
CPC ............ *G06F 21/6218* (2013.01); *G06F 8/61* (2013.01); *H04B 1/3816* (2013.01);
(Continued)

(58) Field of Classification Search
None
See application file for complete search history.

(56) References Cited

U.S. PATENT DOCUMENTS 6,978,152 B1   12/2005   Yamaashi et al.
7,024,390 B1    4/2006   Mori et al.
(Continued)

FOREIGN PATENT DOCUMENTS

CN    101080051 A    11/2007
CN    101179401 A     5/2008
(Continued)

OTHER PUBLICATIONS

Office Action (Notice of Reasons for Rejection) issued on Aug. 19, 2014, by the Japan Patent Office in Japanese Patent Application No. 2013-542497, and an English Translation of the Office Action. (9 pages).

(Continued)

*Primary Examiner* — Jenee Williams
(74) *Attorney, Agent, or Firm* — Buchanan Ingersoll & Rooney PC

(57) ABSTRACT

The invention proposes a method consisting in:
  opening, at the request of the UICC, a data channel between the terminal and the server;
  performing a mutual authentication between the UICC and the server by using the bootstrap credentials;
  requesting, from the UICC to the server, the delivery of a subscription profile by using the unique serial number;
  if a subscription profile exists for the UICC, downloading the subscription profile to the UICC.

3 Claims, 1 Drawing Sheet

(51) Int. Cl.
| | |
|---|---|
| H04W 12/10 | (2009.01) |
| G06F 9/445 | (2006.01) |
| H04W 4/00 | (2009.01) |
| H04W 12/04 | (2009.01) |
| H04W 8/20 | (2009.01) |
| H04L 29/06 | (2006.01) |
| H04W 12/06 | (2009.01) |
| H04L 29/08 | (2006.01) |
| H04L 9/08 | (2006.01) |
| H04W 8/22 | (2009.01) |
| H04B 1/3816 | (2015.01) |
| H04W 12/08 | (2009.01) |
| H04W 8/18 | (2009.01) |
| H04W 84/04 | (2009.01) |

(52) U.S. Cl.
CPC ........ *H04L 9/0825* (2013.01); *H04L 63/0428* (2013.01); *H04L 63/08* (2013.01); *H04L 63/083* (2013.01); *H04L 63/123* (2013.01); *H04L 67/34* (2013.01); *H04W 4/001* (2013.01); *H04W 4/003* (2013.01); *H04W 4/005* (2013.01); *H04W 8/183* (2013.01); *H04W 8/205* (2013.01); *H04W 8/22* (2013.01); *H04W 8/245* (2013.01); *H04W 12/04* (2013.01); *H04W 12/06* (2013.01); *H04W 12/08* (2013.01); *H04W 12/10* (2013.01); *H04W 8/18* (2013.01); *H04W 84/04* (2013.01)

(56) References Cited

U.S. PATENT DOCUMENTS

| | | | |
|---|---|---|---|
| 7,146,161 B2 | 12/2006 | Chou | |
| 7,349,719 B2 | 3/2008 | Buniatyan | |
| 7,363,056 B2 | 4/2008 | Faisy | |
| 7,406,332 B1* | 7/2008 | Gaillard | H04W 88/02 235/380 |
| 9,092,775 B2 | 7/2015 | Bernard et al. | |
| 2002/0174071 A1* | 11/2002 | Boudou | G06F 9/44526 705/41 |
| 2002/0186845 A1 | 12/2002 | Dutta et al. | |
| 2003/0014528 A1* | 1/2003 | Crutcher | H04L 63/0281 709/229 |
| 2003/0194071 A1* | 10/2003 | Ramian | H04M 15/00 379/114.19 |
| 2004/0131186 A1 | 7/2004 | Kasuya et al. | |
| 2004/0235523 A1 | 11/2004 | Schrire et al. | |
| 2005/0021875 A1 | 1/2005 | Bouthemy et al. | |
| 2005/0164737 A1 | 7/2005 | Brown | |
| 2005/0186954 A1 | 8/2005 | Kenney | |
| 2005/0239504 A1* | 10/2005 | Ishii et al. | 455/558 |
| 2005/0266883 A1 | 12/2005 | Chatrath | |
| 2005/0279826 A1 | 12/2005 | Merrien | |
| 2006/0049243 A1 | 3/2006 | Sakamura et al. | |
| 2006/0079284 A1* | 4/2006 | Lu et al. | 455/558 |
| 2006/0080493 A1* | 4/2006 | Leon | G06F 11/1435 711/4 |
| 2006/0086785 A1 | 4/2006 | Sakata | |
| 2006/0196931 A1 | 9/2006 | Holtmanns et al. | |
| 2006/0199614 A1 | 9/2006 | Hyacinthe | |
| 2006/0205388 A1* | 9/2006 | Semple | H04L 63/0853 455/411 |
| 2007/0105532 A1 | 5/2007 | Martin et al. | |
| 2007/0239857 A1* | 10/2007 | Mahalal et al. | 709/219 |
| 2008/0090614 A1 | 4/2008 | Sicher et al. | |
| 2008/0130879 A1 | 6/2008 | Heinonen et al. | |
| 2008/0132215 A1* | 6/2008 | Soderstrom | H04L 12/1818 455/416 |
| 2008/0261561 A1 | 10/2008 | Gehrmann | |
| 2008/0292074 A1* | 11/2008 | Boni | H04M 3/54 379/93.11 |
| 2008/0319823 A1* | 12/2008 | Ahn | G06Q 30/02 705/51 |
| 2009/0159692 A1 | 6/2009 | Chew et al. | |
| 2009/0163175 A1 | 6/2009 | Shi et al. | |
| 2009/0191857 A1 | 7/2009 | Horn et al. | |
| 2009/0191917 A1 | 7/2009 | Zappulla et al. | |
| 2009/0191918 A1* | 7/2009 | Mardiks | 455/558 |
| 2009/0215431 A1 | 8/2009 | Koraichi | |
| 2009/0217348 A1 | 8/2009 | Salmela et al. | |
| 2009/0287921 A1* | 11/2009 | Zhu | G06Q 10/02 713/155 |
| 2009/0307142 A1 | 12/2009 | Mardikar | |
| 2010/0057843 A1* | 3/2010 | Landsman | H04L 63/0407 709/203 |
| 2010/0179907 A1 | 7/2010 | Atkinson | |
| 2011/0028126 A1 | 2/2011 | Lim et al. | |
| 2011/0035584 A1 | 2/2011 | Meyerstein et al. | |
| 2011/0055573 A1* | 3/2011 | Low | G06F 21/34 713/172 |
| 2011/0059773 A1 | 3/2011 | Neumann et al. | |
| 2011/0081950 A1* | 4/2011 | Guven | H04W 12/08 455/558 |
| 2011/0126017 A1* | 5/2011 | Blom | H04L 63/06 713/171 |
| 2011/0126183 A1 | 5/2011 | Bernard et al. | |
| 2011/0136482 A1 | 6/2011 | Kaliner | |
| 2011/0237190 A1 | 9/2011 | Jolivet | |
| 2011/0237289 A1* | 9/2011 | Fodor | H04W 52/367 455/522 |
| 2011/0302641 A1 | 12/2011 | Hald et al. | |
| 2011/0306318 A1* | 12/2011 | Rodgers | H04W 8/183 455/410 |
| 2011/0320600 A1 | 12/2011 | Froeding et al. | |
| 2012/0028609 A1 | 2/2012 | Hruska | |
| 2012/0099428 A1* | 4/2012 | Kamdar | H04L 41/5022 370/235 |
| 2012/0102556 A1* | 4/2012 | Tapia | G06F 21/31 726/7 |
| 2012/0108295 A1 | 5/2012 | Schell et al. | |
| 2012/0113865 A1 | 5/2012 | Zhao et al. | |
| 2012/0115477 A1* | 5/2012 | Ali | H04L 65/1073 455/435.1 |
| 2012/0115542 A1* | 5/2012 | Griffin | H04W 8/205 455/552.1 |
| 2012/0117635 A1* | 5/2012 | Schell | G06F 21/34 726/9 |
| 2012/0190354 A1 | 7/2012 | Merrien et al. | |
| 2012/0297473 A1 | 11/2012 | Case et al. | |
| 2013/0023236 A1* | 1/2013 | Murray | H04W 4/001 455/411 |
| 2013/0203465 A1* | 8/2013 | Ali | H04W 4/003 455/558 |
| 2013/0210386 A1* | 8/2013 | Perlin | H04L 63/12 455/411 |
| 2013/0227646 A1* | 8/2013 | Haggerty | H04L 63/0853 726/3 |
| 2013/0283047 A1* | 10/2013 | Merrien | H04W 12/08 713/164 |
| 2013/0318355 A1 | 11/2013 | Girard et al. | |
| 2013/0324091 A1 | 12/2013 | Girard et al. | |
| 2014/0019760 A1 | 1/2014 | Vergnes et al. | |
| 2014/0024343 A1 | 1/2014 | Bradley | |
| 2014/0031083 A1 | 1/2014 | Vergnes et al. | |
| 2014/0057680 A1 | 2/2014 | Proust et al. | |
| 2014/0066011 A1 | 3/2014 | Bradley | |
| 2014/0122872 A1 | 5/2014 | Merrien et al. | |
| 2014/0141747 A1 | 5/2014 | Merrien et al. | |

FOREIGN PATENT DOCUMENTS

| | | |
|---|---|---|
| CN | 101309518 A | 11/2008 |
| DE | 10 2008 033 976 A1 | 1/2010 |
| EP | 1 650 717 A1 | 4/2006 |
| EP | 1 965 596 A1 | 9/2008 |
| EP | 2 056 523 A1 | 5/2009 |
| EP | 2 076 071 A1 | 7/2009 |
| FR | 2 871 020 A1 | 12/2005 |

(56) References Cited

FOREIGN PATENT DOCUMENTS

| | | |
|---|---|---|
| GB | 2 457 221 A | 8/2009 |
| JP | 2002-236572 A | 8/2002 |
| JP | 2005-323128 A | 11/2005 |
| JP | 2006-050554 A | 2/2006 |
| JP | 2006-107316 A | 4/2006 |
| JP | 2007-019897 A | 1/2007 |
| JP | 2007-513534 A | 5/2007 |
| JP | 2007-201883 A | 8/2007 |
| JP | 2007-235492 A | 9/2007 |
| JP | 2008-131469 A | 6/2008 |
| JP | 2008-519343 A | 6/2008 |
| JP | 2009-037602 A | 2/2009 |
| JP | 2009-038598 A | 2/2009 |
| JP | 2010-501092 A | 1/2010 |
| JP | 2010-532107 A | 9/2010 |
| JP | 2011-525311 A | 9/2011 |
| JP | 2012-528534 A | 11/2012 |
| KR | 2002-0066032 A | 8/2002 |
| KR | 2003-0044260 A | 6/2003 |
| KR | 10-0489783 B1 | 5/2005 |
| KR | 10-2005-0095424 A | 9/2005 |
| KR | 2007-0095048 A | 9/2007 |
| KR | 10-2008-0014285 A | 2/2008 |
| KR | 10-2008-0015870 A | 2/2008 |
| KR | 10-2009-0056019 A | 6/2009 |
| KR | 10-2010-0095648 A | 8/2010 |
| KR | 10-2010-011642 A | 10/2010 |
| WO | 02/082715 A1 | 10/2002 |
| WO | 03/104997 A1 | 12/2003 |
| WO | 2004/021296 A1 | 3/2004 |
| WO | 2004/105421 A2 | 12/2004 |
| WO | 2007/058241 A1 | 5/2007 |
| WO | 2008/128874 A1 | 10/2008 |
| WO | WO 2008/123827 A1 | 10/2008 |
| WO | 2009/055910 A1 | 5/2009 |
| WO | 2009/092115 A2 | 7/2009 |
| WO | 2009091837 A1 | 7/2009 |
| WO | 2009/095295 A1 | 8/2009 |
| WO | WO 2009/103623 A2 | 8/2009 |
| WO | 2009/141024 A1 | 11/2009 |
| WO | 2009/141035 A1 | 11/2009 |
| WO | 2009/149788 A2 | 12/2009 |
| WO | 2010/052332 A1 | 5/2010 |
| WO | 2010068016 A3 | 6/2010 |
| WO | 2010/138592 A2 | 12/2010 |
| WO | 2011139795 A1 | 11/2011 |
| WO | 2011159549 A1 | 12/2011 |
| WO | 2012012526 A1 | 1/2012 |
| WO | 2012058092 A1 | 5/2012 |
| WO | 2012058099 A1 | 5/2012 |
| WO | 2012058429 A2 | 5/2012 |
| WO | 2012058446 A1 | 5/2012 |
| WO | 2012058450 A1 | 5/2012 |
| WO | 2012061516 A1 | 5/2012 |
| WO | 2012061561 A2 | 5/2012 |
| WO | 2012065112 A2 | 5/2012 |

OTHER PUBLICATIONS

Office Action (Notice of Preliminary Rejection) issued on Jun. 27, 2014, by the Korean Intellectual Property Office, in Korean Patent Application No. 10-2013-7017637, and an English Translation of the Office Action. (7 pages).
Office Action (Notice of Preliminary Rejection) issued on Aug. 19, 2014, by the Korean Intellectual Property Office in Korean Patent Application No. 10-2013-7016486, and an English Translation of the Office Action. (6 pages).
Office Action (Notice of Reasons for Rejection) issued on Aug. 5, 2014, by the Japan Patent Office in Japanese Patent Application No. 2013-542474, and an English Translation of the Office Action. (4 pages).
Partial European Search Report issued on Jul. 22, 2011, by the European Patent Office in the European Application No. 10 30 6359. (7 pages).
An English Translation of the Office Action (Notice of Reasons for Rejection) issued on Apr. 15, 2014, by the Japan Patent Office in the Japanese Patent Application No. 2013-542477. (3 pages).
"3rd Generation Partnership Project; Technical Specification Group Services and System Aspects; 3G Security; Specification of the MILENAGE Algorithm Set; An example algorithm set for the 3GPP authentication and key generation functions f1, f1*, f2, f3, f4, f5 and f5*; Document 2: Algorithm Specification (Release 11)", 3GPP TS 35.206 V11.0.0 (Sep. 2012), pp. 1-31.
International Search Report (Form PCT/ISA/210) and the Written Opinion of the International Searching Authority (Form PCT/ISA/237) issued on Feb. 22, 2012, by the European Patent Office in the International Application No. PCT/EP2011/071674. (8 pages).
"3rd Generation Partnership Project; Technical Specification Group Services and System Aspects; Feasibility Study on Remote Management of USIM Application on M2M Equipment; (Release 8)", 3GPP TR 33.812 V1.0.0 (Sep. 2008), pp. 1-80.
International Search Report (Form PCT/ISA/210) and the Written Opinion of the International Searching Authority (Form PCT/ISA/237) issued on Feb. 27, 2012, by the European Patent Office in the International Application No. PCT/EP2011/071660. (6 pages).
An English Translation of the Office Action (Notice of Reasons for Rejection) issued on Jun. 17, 2014, by the Japan Patent Office in the Japanese Patent Application No. 2013-542492. (3 pages).
International Search Report (Form PCT/ISA/210) and the Written Opinion of the International Searching Authority (Form PCT/ISA/237) issued on Mar. 28, 2012, by the European Patent Office in the International Application No. PCT/EP2011/071737. (6 pages).
An English Translation of the Office Action (Notice of Reasons for Rejection) issued on Apr. 30, 2014, by the Japan Patent Office in the Japanese Patent Application No. 2013-542496. (2 pages).
International Search Report (Form PCT/ISA/210) and the Written Opinion of the International Searching Authority (Form PCT/ISA/237) issued on Feb. 15, 2012, by the European Patent Office in the International Application No. PCT/EP2011/071778. (9 pages).
International Search Report (Form PCT/ISA/210) and the Written Opinion of the International Searching Authority (Form PCT/ISA/237) issued on Feb. 27, 2012, by the European Patent Office in the International Application No. PCT/EP2011/071781. (11 pages).
International Search Report (Form PCT/ISA/210) and the Written Opinion of the International Searching Authority (Form PCT/ISA/237) issued on Apr. 4, 2012, by the European Patent Office in the International Application No. PCT/EP2011/071731. (12 pages).
"3rd Generation Partnership Project; Technical Specification Group Services and System Aspects; Service aspects; Service principles (Release 11)", 3GPP TS 22.101 V11.0.0 (Sep. 2010), pp, 1-60.
International Search Report (Form PCT/ISA/210) and the Written Opinion of the International Searching Authority (Form PCT/ISA/237) issued on Apr. 16, 2012, by the European Patent Office in the International Application No. PCT/EP2011/071919. (7 pages).
International Search Report (Form PCT/ISA/210) and the Written Opinion of the International Searching Authority (Form PCT/ISA/237) issued on Feb. 27, 2012, by the European Patent Office in the International Application No. PCT/EP2011/071664. (8 pages).
Written Opinion of the International Preliminary Examining Authority (Form PCT/IPEA/408) issued on Dec. 13, 2012, by the European Patent Office in the International Application No. PCT/EP2011/071664. (5 pages).
Notification of Transmittal of the International Preliminary Report on Patentability (Forms PCT/IPEA/416 and PCT/IPEA/409) issued on Mar. 8, 2013, by the European Patent Office in the International Application No. PCT/EP2011/071664. (14 pages).
International Search Report (Form PCT/ISA/210) and the Written Opinion of the International Searching Authority (Form PCT/ISA/237) issued on Apr. 12, 2012, by the European Patent Office in the International Application No. PCT/EP2011/071695 and comments filed by the Applicant on May 31, 2012. (10 pages).

(56) References Cited

OTHER PUBLICATIONS

International Search Report (Form PCT/ISA/210) and the Written Opinion of the International Searching Authority (Form PCT/ISA/237) issued on Apr. 5, 2012, by the European Patent Office in the International Application No. PCT/EP2011/071785. (9 pages).
Vergnes et al., U.S. Appl. No. 13/992,103, entitle "Method for Exporting Data of a Javacard Application Stored in a UICC to a Host" filed Jun. 6, 2013.
Office Action issued by the U.S. Patent and Trademark Office in the U.S. Appl. No. 13/312,309, mailed Sep. 25, 2013, U.S. Patent and Trademark Office, Alexandria, VA. (13 pages).
Office Action issued by the U.S. Patent and Trademark Office in the U.S. Appl. No. 13/312,309, mailed Apr. 24, 2014, U.S. Patent and Trademark Office, Alexandria, VA. (13 pages).
"Smart Cards; Card Application Toolkit (CAT) (Release 9)", ETSI TS 102 223, vol. SCP TEC, No. V9.2.0, (Oct. 1, 2010), pp. 1-209.
International Search Report (PCT/ISA/210) issued on Feb. 22, 2012, by the European Patent Office as the International Searching Authority for International Application No. PCT/EP2011/071675.
Written Opinion (PCT/ISA/237) issued on Feb. 22, 2012, by the European Patent Office as the International Searching Authority for International Application No. PCT/EP2011/071675.
"IP Based Over-the-Air Handset Configuration Management (IOTA-HCM)", Jul. 11, 2003, pp. 1-68, retrieved from the internet: http://www.3gpp2.org/public_html/specs/C.S0040-0_v1.0_110403.pdf.
G. Madlmayr et al., "The benefit of using SIM application toolkit in the context of near field communication applications", Sixth Internaitonal Conference on the Management of Mobile Business (ICMB 2007), Jul. 2007, 8 pages.
Office Action (Notice of Preliminary Rejection) issued on Feb. 25, 2015, by the Korean Patent Office in Korean Patent Application No. 10-2013-0717638, and an English Translation of the Office Action. (7 pages).
Office Action issued by the U.S. Patent and Trademark Office in the U.S. Appl. No. 13/991,766, mailed Mar. 17, 2015, U.S. Patent and Trademark Office, Alexandria, VA. (33 pages).
Office Action issued by the U.S. Patent and Trademark Office in the U.S. Appl. No. 13/992,039, mailed Mar. 17, 2015, U.S. Patent and Trademark Office, Alexandria, VA. (35 pages).
Office Action issued by the U.S. Patent and Trademark Office in the U.S. Appl. No. 13/991,744, mailed Jun. 2, 2015, U.S. Patent and Trademark Office, Alexandria, VA. (35 pages).
Office Action issued by the U.S. Patent and Trademark Office in the U.S. Appl. No. 13/991,689, mailed Jun. 18, 2015, U.S. Patent and Trademark Office, Alexandria, VA. (46 pages).
Office Action issued by the U.S. Patent and Trademark Office in the U.S. Appl. No. 13/991,823, mailed Jul. 13, 2015, U.S. Patent and Trademark Office, Alexandria, VA. (21 pages).
Office Action issued by the U.S. Patent and Trademark Office in the U.S. Appl. No. 13/991,912, mailed Jul. 23, 2015, U.S. Patent and Trademark Office, Alexandria, VA. (45 pages).
Office Action issued by the U.S. Patent and Trademark Office in the U.S. Appl. No. 13/992,103, mailed Jul. 13, 2015, U.S. Patent and Trademark Office, Alexandria, VA. (42 pages).
Office Action issued by the U.S. Patent and Trademark Office in the U.S. Appl. No. 13/992,065, mailed Jul. 30, 2015, U.S. Patent and Trademark Office, Alexandria, VA. (32 pages).
English translation of Office Action issued by the Korean Patent Office on Aug. 28, 2014 in corresponding Korean Application No. 10-2013-7016004. (3 pages).
English translation of Office Action issued by the Korean Patent Office on Apr. 16, 2015 in corresponding Korean Application No. 10-2013-7016004. (2 pages).
Office Action issued by the Russian Patent Office dated Dec. 29, 2014 in corresponding Russian Application No. 2013131034, and English translation of Office Action. (6 pages).
Office Action issued by the U.S. Patent and Trademark Office in the U.S. Appl. No. 13/991,823, mailed Jan. 5, 2015, U.S. Patent and Trademark Office, Alexandria, VA. (25 pages).
Office Action issued by the U.S. Patent and Trademark Office in the U.S. Appl. No. 13/992,065, mailed Dec. 18, 2014, U.S. Patent and Trademark Office, Alexandria, VA. (26 pages).
Office Action issued by the U.S. Patent and Trademark Office in the U.S. Appl. No. 13/991,744, mailed Dec. 12, 2014, U.S. Patent and Trademark Office, Alexandria, VA. (33 pages).
Notice of Allowance issued by the U.S. Patent and Trademark Office in the U.S. Appl. No. 13/991,752, mailed Jan. 21, 2015, U.S. Patent and Trademark Office, Alexandria, VA. (33 pages).
3GPP TS 22.101 V11.0.0 (Sep. 2010), Sep. 2010.
European Office Action dated Dec. 23, 2015 issued in corresponding European Patent Appln. No. 11 810 809.1 (5 pages).
European Office Action dated Jan. 19, 2016 issued in corresponding European Patent Appln. No. 11 811 335.6 (6 pages).
Japanese Office Action dated Jan. 5, 2016 issued in corresponding Japanese Patent Appln. No. 2015-082449, with English translation (5 pages).
Japanese Office Action dated Jan. 19, 2016 issued in corresponding Japanese Patent Appln. No. 2013-054275 with English translation (14 pages).
U.S. Office Action dated Feb. 1, 2016 issued in corresponding U.S. Appl. No. 13/991,823 (15 pages).
U.S. Office Action dated Feb. 2, 2016 issued in corresponding U.S. Appl. No. 13/991,912 (30 pages).
U.S. Office Action dated Feb. 2, 2016 issued in corresponding U.S. Appl. No. 13/992,039 (24 pages).
U.S. Office Action dated Feb. 10, 2016 issued in corresponding U.S. Appl. No. 13/992,065 (23 pages).
Office Action issued by the Chinese Patent Office on Aug. 19, 2015 in corresponding Chinese Application No. 201180058922.2, and English language translation of Office Action (16 pages).
Office Action issued by the Chinese Patent Office on Nov. 4, 2015 in corresponding Chinese Application No. 201180058688.3 (5 pages).
Office Action issued by the U.S. Patent and Trademark Office in the U.S. Appl. No. 13/991,766, mailed Oct. 1, 2015, U.S. Patent and Trademark Office, Alexandria, VA. (27 pages).
Office Action issued by the U.S. Patent and Trademark Office in the U.S. Appl. No. 13/992,039, mailed Oct. 1, 2015, U.S. Patent and Trademark Office, Alexandria, VA. (28 pages).
Office Action issued by the U.S. Patent and Trademark Office in the U.S. Appl. No. 14/603,889, mailed Oct. 23, 2015, U.S. Patent and Trademark Office, Alexandria, VA. (36 pages).
Office Action issued by the Chinese Patent Office on Aug. 27, 2015 in corresponding Chinese Application No. 201180058683.0, and English language translation of Office Action (17 pages).
Office Action issued by the U.S. Patent and Trademark Office in U.S. Appl. No. 13/992,103, mailed Nov. 25, 2015, U.S. Patent and Trademark Office, Alexandria, VA (22 pages).
Office Action issued Nov. 17, 2015 by the Chinese Patent Office in corresponding Chinese Patent Application No. 201180058925.6 (10 pages).
Office Action (Notice of Reasons for Rejection) issued on Feb. 2, 2016, by the Japanese Patent Office in Japanese Patent Application No. 2015-018547, and an English Translation of the Office Action. (5 pages).
Office Action issued by the U.S. Patent and Trademark Office in the U.S. Appl. No. 13/992,103, mailed Mar. 30, 2016, U.S. Patent and Trademark Office, Alexandria, VA. (15 pages).
Office Action issued on Jan. 19, 2016, by the European Patent Office in European Patent Application No. 11 811 335.6 (4 pages).
3rd Generation Partnership Project; Technical Specification Group Services and System Aspects; Feasibility study on the security aspects of remote provisioning and change of subscription for Machine to Machine (M2M) equipment (Release 9); 3GPP Draft; 33812-920, published by the 3rd Generation Partnership Project (3GPP) in Sophia-Antipolis Cedex, France on Jun. 22, 2010 (87 pages).

\* cited by examiner

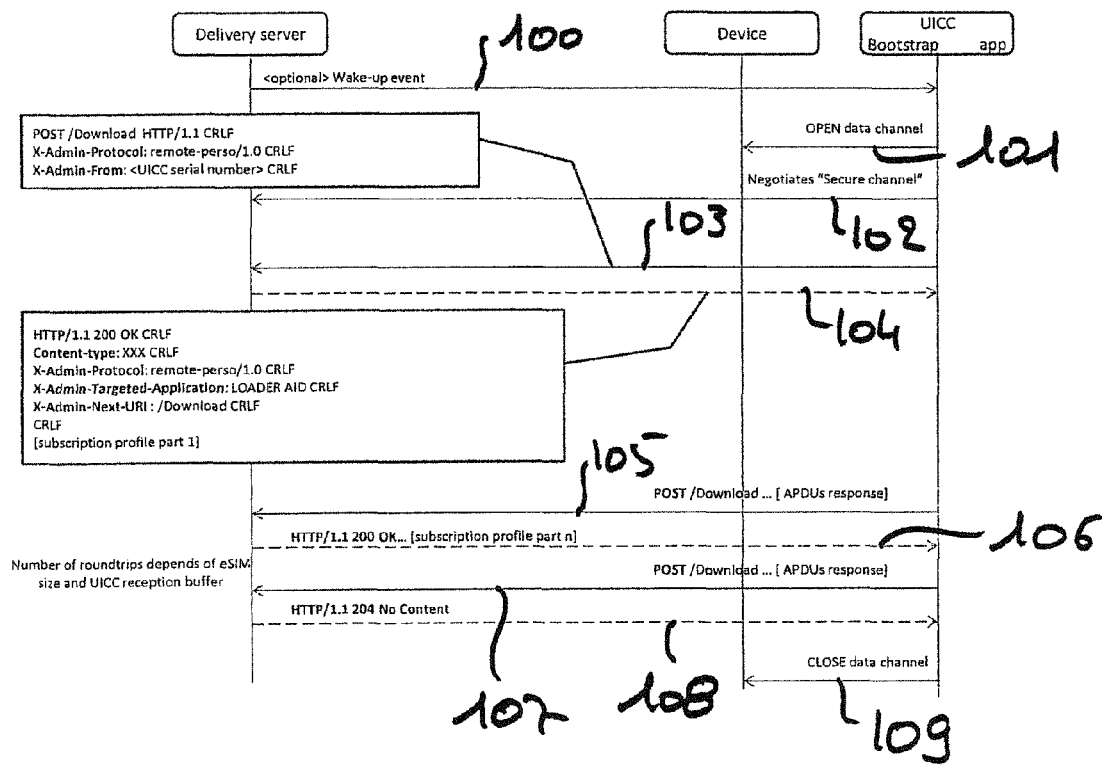

METHOD FOR REMOTELY DELIVERING A FULL SUBSCRIPTION PROFILE TO A UICC OVER IP

This disclosure is a national phase of PCT/EP2011/071675, a continuation of U.S. application Ser. No. 13/312,309, filed Dec. 6, 2011, and claims priority of European Application No. 10306359.0, filed Dec. 6, 2010, the disclosures of which are hereby incorporated by reference.

The present invention concerns a method for remotely delivering a full subscription profile to a UICC over IP.

In the domain of telecommunications, secure elements, like UICCs (Universal Integrated Circuit Card) embedding Sim applications, are installed, fixedly or not, in terminals, like for example mobile phones. In some cases, the terminals are constituted by machines that communicate with other machines for M2M (Machine to Machine) applications.

A UICC can be in the format of a smart card, or may be in any other format such as for example but not limited to a packaged chip as described in PCT/SE2008/050380, or any other format. It can be used in mobile terminals in GSM and UMTS networks for instance. The UICC ensures network authentication, integrity and security of all kinds of personal data.

In a GSM network, the UICC contains mainly a SIM application and in a UMTS network it is the USIM application. A UICC may contain several other applications, making it possible for the same smart card to give access to both GSM and UMTS networks, and also provide storage of a phone book and other applications. It is also possible to access a GSM network using an USIM application and it is possible to access UMTS networks using a SIM application with mobile terminals prepared for this. With the UMTS release 5 and later stage network like LTE, a new application, the IP multimedia Services Identity Module (ISIM) is required for services in the IMS (IP Multimedia Subsystem). The telephone book is a separate application and not part of either subscription information module.

In a CDMA network, the UICC contains a CSIM application, in addition to 3GPP USIM and SIM applications. A card with all three features is called a removable user identity card, or R-UIM. Thus, the R-UIM card can be inserted into CDMA, GSM, or UMTS handsets, and will work in all three cases.

In 2G networks, the SIM card and SIM application were bound together, so that "SIM card" could mean the physical card, or any physical card with the SIM application.

The UICC smart card consists of a CPU, ROM, RAM, EEPROM and I/O circuits. Early versions consisted of the whole full-size (85×54 mm, ISO/IEC 7810 ID-1) smart card. Soon the race for smaller telephones called for a smaller version of the card.

Since the card slot is standardized, a subscriber can easily move their wireless account and phone number from one handset to another. This will also transfer their phone book and text messages. Similarly, usually a subscriber can change carriers by inserting a new carrier's UICC card into their existing handset. However, it is not always possible because some carriers (e.g. in U.S.) SIM-LOCK the phones that they sell, thus preventing competitor carriers' cards being used.

The integration of the ETSI framework and the Application management framework of Global Platform is standardized in the UICC configuration.

UICCs are standardized by 3GPP and ETSI.

A UICC can normally be removed from a mobile terminal, for example when the user wants to change his mobile terminal. After having inserted his UICC in his new terminal, the user will still have access to his applications, contacts and credentials (network operator).

It is also known to solder or weld the UICC in a terminal, in order to get it dependent of this terminal. This is done in M2M (Machine to Machine) applications. The same objective is reached when a chip (a secure element) containing the SIM or USIM applications and files is contained in the terminal. The chip is for example soldered to the motherboard of the terminal or machine and constitutes an e-UICC.

Some of the further disclosed inventions apply to such soldered UICCs or to such chips containing the same applications than the chips comprised in UICCs. A parallel can be done for UICCs that are not totally linked to devices but that are removable with difficulty because they are not intended to be removed, located in terminals that are distant or deeply integrated in machines. A special form factor of the UICC (very small for example and therefore not easy to handle) can also be a reason to consider it as in fact integrated in a terminal. The same applies when a UICC is integrated in a machine that is not intended to be opened.

In the next description, welded UICCs or chips containing or designed to contain the same applications than UICCs will generally be called embedded UICCs or embedded secure elements (in contrast to removable UICCs or removable secure elements). This will also apply to UICCs or secure elements that are removable with difficulty.

The present invention concerns a method for remotely delivering a full subscription profile to a UICC over IP. More precisely, the invention concerns the delivery of a full subscription profile (including File System, Security Domains, Applications (STK, USIM, ISM, . . . ), unique data like Ki, applicative keys, . . . ) to a UICC embedded in a device using an HTTP transport OTI or OTA.

The invention proposes to solve the following problem. Once a UICC is attached to a receiving device, for instance soldered, or simply not physically removable because of the device form factor, or because not economically viable (distance, . . . ), or when the device has to be commercialized without any attachment to a particular subscription (in order to give to the end-user the possibility to choose separately the device and the subscription), it is no longer possible to personalize the UICC at manufacturing stage with subscription profile.

The invention proposes a way to perform the personalization of a UICC remotely, in a very secure way, when the UICC is already deployed on the market without low expectations regarding device functionalities (IP connectivity only). The MNO profile has to be downloaded via OTA or OTI since the UICC is already in the field.

The invention proposes to use the HTTP protocol in order to personalize remotely a UICC.

More precisely, the invention proposes a method for remotely delivering a full subscription profile to a UICC over IP, the UICC being installed in a terminal able to provide an IP connectivity to a remote server and give access to the UICC. The UICC is pre-personalised with a unique serial number and with a bootstrap application and bootstrap credentials allowing establishing a secure transport channel with the remote server. The remote server hosts a stock of subscription profiles and acts as a web server. According to the invention, the method consists in:

opening, at the request of the UICC, a data channel between the terminal and the server;

performing a mutual authentication between the UICC and the server by using the bootstrap credentials;

requesting, from the UICC to the server, the delivery of a subscription profile by using the unique serial number;

if a subscription profile exists for the UICC, downloading the subscription profile to the UICC.

Preferably, the http communication protocol is used between the UICC and the remote server.

Advantageously, the UICC and the terminal communicate over a BIP channel.

The present invention will be better understood by reading the following description in relation to FIG. 1 that describes the overall overflow of an embodiment of the invention.

This invention requires:
- a UICC pre-personalised with a unique serial number and with a bootstrap application, bootstrap credentials allowing to establish a secure transport channel with a remote server entity;
- a remote Delivery server which role is to host and deliver a stock of subscription profiles and acting as a simple web server;
- a device (terminal) able to provide an IP connectivity to the remote server and give access to the UICC, for instance through a BIP interface. The connectivity may be provided by any of these methods for instance: wired, WIFI, OTA through a pre-loaded UICC subscription which role is to only provide initial data connection.

The diagram of FIG. 1 presents the overall flow.

At the beginning of the sequence we assume that the subscription profile for the UICC has been determined and reserved in the Delivery server.

At step 100, optionally, the Delivery Server may send to the UICC a wake-up event to triggers UICC connection. This may also be achieved simply by the UICC itself at power on, or by a periodic connection.

At step 101, the UICC requests the device to open a data channel. At this stage the UICC may provide connectivity information. A preferred method would be a BIP OPEN CHANNEL command.

At step 102, the UICC negotiates the opening of a secure channel with the Delivery Server using its pre-loaded credentials. A preferred method would be the establishment of a SCP 81 (PSK-TLS) channel as defined in Global Platform. During this step, a mutual authentication occurs between the UICC and the Delivery server and the integrity of the exchanged data can be verified.

At step 103, the UICC sends a first HTTP POST request to the delivery server using a pre-defined (or configurable) URL, requesting the delivery of the subscription profile. This request shall at least comprise the UICC serial number. The POST request in the diagram is given as example.

The Delivery Server then checks if a subscription profile is available for this UICC. If yes, at step 104, the Delivery server returns an HTTP 200 OK response with the subscription profile as body of the answer. In case no subscription profile is available for this UICC a 204 No content response shall be returned.

The UICC then receives the HTTP response and executes the loading of the subscription profile. At step 105, the UICC sends a second HTTP POST request on the URL given as NEXT-URI in the server response. This POST shall include loading execution status.

In case the UICC is not able to receive in a single answer the whole subscription profile, it may be required to perform several round-trips between UICC and delivery server (steps 106 and 107).

The sequence shall end when the whole subscription profile has been delivered. In that case the last Delivery Server HTTP response shall indicate a 204 No content (step 108).

At step 109, the UICC closes the data channel established with the device.

This method may also be applicable to an UICC not physically attached to the device (removable UICC).

HTTP protocol is preferably used for communicating with the delivery server, and BIP protocol for the communications between the UICC and the device.

The invention claimed is:

1. Method for remotely delivering a full subscription profile to a UICC over IP, said UICC being installed in a terminal able to provide an IP connectivity to a remote server and give access to said UICC, sad UICC being pre-personalised with a globally unique serial number unique to said UICC and with a bootstrap application and bootstrap credentials enabling the UICC to establish a secure transport channel with said remote server, said remote server hosting a stock of subscription profiles, said method comprising:
   opening, at a request of said UICC, a data channel between said terminal and said server, wherein said server acts as a web server;
   performing a mutual authentication between said UICC and said server by using said bootstrap credentials and server credentials;
   requesting, from said UICC to said server, delivery of a full subscription profile by using said globally unique serial number using a pre-defined or configurable uniform resource locator; and
   if a subscription profile associated with said globally unique serial number exists for said UICC, downloading said full subscription profile to said UICC.

2. Method according to claim 1, wherein http communication protocol is used between said UICC and said remote server.

3. Method according to claim 1, wherein said UICC and said terminal communicate over a bearer independent protocol (BIP) channel.

* * * * *